3,284,448
19-SUBSTITUTED-10α-ANDROSTANES
Alexander D. Cross, Mexico City, Mexico, assignor to Syntex Corporation, Panama, Panama, a corporation of Panama
No Drawing. Filed June 15, 1964, Ser. No. 375,383
23 Claims. (Cl. 260—239.55)

The present invention relates to novel cyclopentanophenanthrene derivatives and to a process for the production thereof.

More particularly the present invention relates to novel 19-substituted-10α-androstane derivatives, to a process for the production thereof and in particular to a novel process for the production of 19-formyl-Δ⁵-10α-androstene or pregnene derivatives from the corresponding 6α-hydroxy-Δ⁵⁽¹⁰⁾-19-nor-androstenes or pregnenes.

The novel compounds of the present invention are represented by the following formulae:

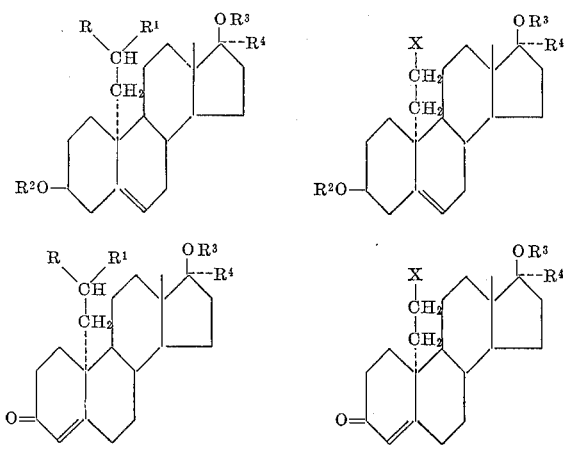

In the above formulae R represents hydroxyl, tosyloxy, a hydrocarbon carboxylic acyloxy group of less than 12 carbon atoms or a cyano group; X represents a halogen atom having an atomic weight of less than 125; R¹ represents hydrogen; R and R¹, together, represent an oxygen atom or a methylene grouping; R² and R³ each represents hydrogen, a hydrocarbon carboxylic acyl group of less than 12 carbon atoms or a tetrahydropyranyl grouping; where R² is tetrahydropyranyl R³ is preferably also tetrahydropyranyl; and R⁴ represents hydrogen, lower alkyl, lower alkenyl or lower alkinyl.

The acyl and acyloxy groups are derived from hydrocarbon carboxylic acids containing less than 12 carbon atoms which may be saturated or unsaturated, of straight, branched, cyclic or cyclic-aliphatic chain or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The novel process of the present invention for producing 19-formyl-Δ⁵-10α-androstenes or pregnenes is schematically represented as follows:

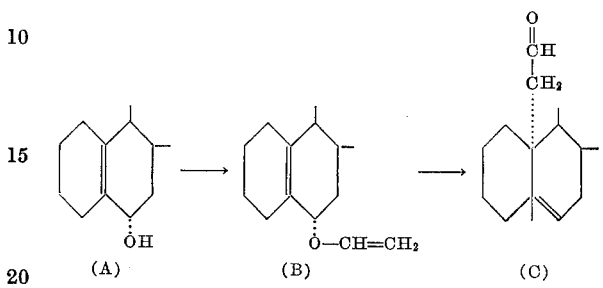

The starting compound (A) for the present process is a 6α-hydroxy-Δ⁵⁽¹⁰⁾-19-nor-androstene or pregnene derivative which may have several substituents without interfering with the reactions, for example, it may have: halogen atoms and/or lower alkyl groups at positions 1, 2, 3, 4, 8, 9, 11, 12, 14, 15, 16, 17 and/or 18 and in the case of pregnanes at C–20 and/or C–21, keto groups, either free or protected, e.g., in the form of ketals, in any of the indicated positions; protected hydroxyl groups, in the form of esters or ethers, in any of the named positions, and the like.

In accordance with the above scheme the starting compound (A) is treated with at least one molar equivalent, but preferably with a large excess of a liquid hydrocarbon aliphatic compound of up to 12 carbon atoms having at least one vinyloxy grouping in its molecule, such as: lower alkyl vinyl ethers, e.g., ethyl vinyl ether, n-butyl vinyl ether or 2-ethyl-hexyl vinyl ether; (lower alkoxy lower alkyl) vinyl ethers, e.g., 2-ethoxyethyl vinyl ether, 2-butoxyethyl vinyl ether; divinyloxy lower alkanes, e.g., 1,2-divinyloxy ethane; or the like, in the presence of a catalytic amount of a mercuric salt of a weak acid, such as mercuric acetate, benzoate, citrate, chromate, oxalate, linoleate or the like, for a period of time of about 1 to 15 hours, and preferably, but not necessarily at reflux temperature, to give the corresponding 6α-vinoxy compound (B) which upon being heated to a temperature between approximately 130° C. and 200° C., either by refluxing in a solvent having a boiling point comprised between said temperatures, such as diglyme, decalin or the like, at about atmospheric pressure, or in a sealed tube, for about 2 to 6 hours, preferably under a nitrogen atmosphere, affords the corresponding 19-formyl-Δ⁵-10α-androstene or pregnene compound (C).

The catalytic amount of mercuric salt, referred to hereinbefore, ranges between approximately 0.1% to 10% of the weight of the reacting mixture.

In addition to the specific examples set forth hereinafter, which illustrate the described process, there are disclosed other examples in my copending U.S. patent application Serial No. 375,384 filed of even date, and now abandoned.

The novel 19-substituted-10α-androstane derivatives of the present invention are prepared by the process exemplified as follows:
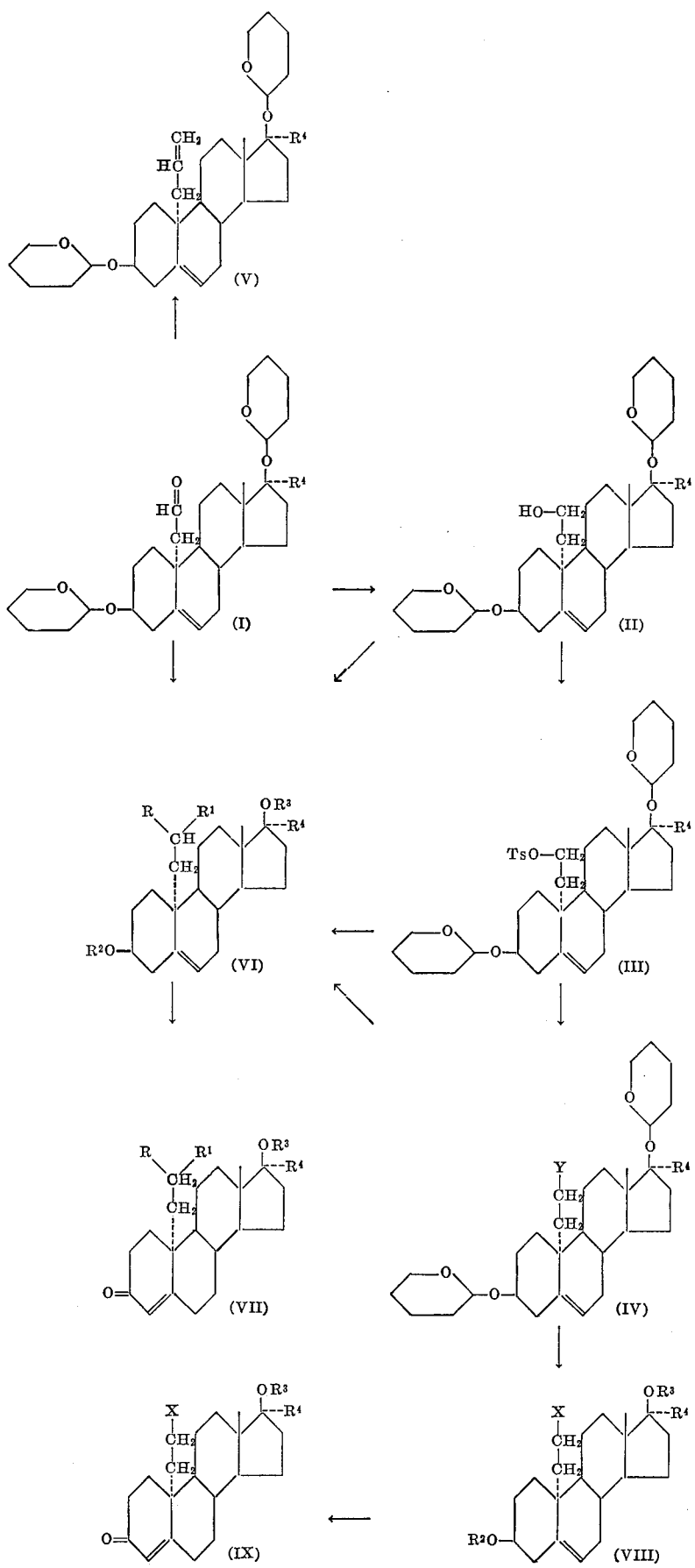

In the above formulae, R, R¹, R², R³, R⁴ and X have the same meaning as set forth hereinbefore; and Y represents a halogen atom having an atomic weight of less than 125 or a cyano group.

In accordance with the above scheme, the starting compound (I), which is a 19-formyl-3β,17β-bis-tetrahydropyranyloxy-Δ⁵-10α-androstene derivative, and is obtained by the process described hereinbefore from the corresponding 6α-hydroxy-Δ⁵⁽¹⁰⁾-19-nor-androstene, is conventionally reduced, e.g., with sodium borohydride, to give the corresponding 19-hydroxymethyl-Δ⁵-10α-androstene (II) which upon reaction with tosyl chloride in pyridine at 0° C. for about 24 hours, yields the corresponding 19-tosyloxymethyl-Δ⁵-10α-androstene (III). The latter compound is treated with an alkali metal halide, e.g., potassium fluoride, lithium chloride or lithium bromide, or an alkali metal cyanide, such as potassium cyanide, in a suitable solvent, for example dimethylformamide or acetonitrile, at reflux temperature for about 5 hours, to give, respectively, the corresponding 19-halomethyl-Δ⁵-10α-androstene (IV; Y=halogen) or the corresponding 19-cyanomethyl-Δ⁵-10α-androstene (IV; Y=cyano).

The starting compound (I) upon treatment with triphenyl phosphonium methyl bromide in the presence of a lower alkyl lithium, e.g., butyl lithium, in an inert solvent, such as ether, for about 14 hours, affords the corresponding 19-vinyl-Δ⁵-10α-androstene compound (V).

The compounds obtained by the methods described hereinbefore having one or more tetrahydropyranyloxy groupings (I, II, III, IV and V) are conventionally hydrolyzed in a weak acid medium to give the corresponding free alcohols (VI, VIII; R²=R³=H).

The 19-substituted-Δ⁵-10α-androstene-3β,17β-diol derivatives (VI, VIII; R²=R³=H) are converted into the corresponding 19 - substituted - Δ⁴ - 10α - androsten-17β-ol-3-one compounds (VII, IX; R³=H) by treatment with a lower alkanone, such as cyclohexanone in the presence of an aluminum lower alkoxide, e.g., aluminum isopropoxide, in an inert solvent, for example toluene, at reflux temperature for approximately 15 minutes.

The compounds of the present invention having a primary and/or a secondary hydroxyl group, are conventionally acylated in pyridine with an acylating agent, such as an anhydride or a chloride of a hydrocarbon carboxylic acid of the type described hereinbefore, to give the corresponding acylates.

The compounds of the present invention having in the molecule a primary, a secondary and/or a tertiary hydroxyl group, are conventionally esterified in the presence of p-toluenesulfonic acid with an acylating agent, such as acetic anhydride, caproic anhydride, cyclopentylpropionic anhydride, or enanthic anhydride, to produce the corresponding esters.

The compounds of the present invention having a free hydroxyl group are conventionally converted into the corresponding tetrahydropyranyloxy derivative by conventional treatment of dihydropyrane in the presence of p-toluenesulfonic acid.

The following specific examples serve to illustrate but are not intended to limit the scope of the present invention:

PREPARATION 1

To a solution of 4 g. of the 3-acetate of Δ⁵ androstene-3β,19-diol-17-one in 150 cc. of dry benzene, were added 6 g. of lead tetraacetate and 8 g. of calcium carbonate and the mixture was refluxed for 2 hours. It was cooled, filtered, water was added to the filtrate, the benzene layer was separated, washed with water and the benzene was evaporated under reduced pressure; upon chromatography of the residue on neutral alumina, there was obtained the diacetate of 19-nor-Δ⁵⁽¹⁰⁾-androstene-3β,6β-diol-17-one.

PREPARATION 2

A solution of 1 g. of sodium borohydride in 3 cc. of water was added to an ice-cooled solution of 1 g. of the latter compound in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 19-nor-Δ⁵⁽¹⁰⁾-androstene-3β,6β,17β-triol.

PREPARATION 3

A solution of 5 g. of the 3-acetate of 19-nor-Δ⁵⁽¹⁰⁾-androstene-3β,6β-diol-17-one in 250 cc. of thiophene-free benzene was treated with 27.5 cc. of 4 N methylmagnesium bromide in ether and the mixture refluxed, with the exclusion of moisture, for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α-methyl-19-nor-Δ⁵⁽¹⁰⁾-androstene-3β,6β,17β-triol.

The above procedure was repeated, except that methyl magnesium bromide was substituted by vinyl magnesium bromide and by ethinyl magnesium bromide, thus giving respectively: 17α-vinyl - 19-nor-Δ⁵⁽¹⁰⁾-androstene-3β,6β,17β-triol and 17α-ethinyl-19-nor-Δ⁵⁽¹⁰⁾-androstene-3β,6β,17β-triol.

PREPARATION 4

A mixture of 1 g. of 19-nor-Δ⁵⁽¹⁰⁾-androstene-3β,6β,17β-triol in 20 cc. of dioxane, and 1.1 molar equivalents of 2,3-dichloro, 5,6-dicyano 1,4-benzoquinone was kept at room temperature for 3 hours. The hydroquinone formed during the reaction was filtered off, and the filtrate evaporated to dryness. The residue was dissolved in acetone and filtered through 20 g. of alumina. Crystallization from acetone hexane gave 19-nor-Δ⁵⁽¹⁰⁾-androstene-3β,17β-diol-6-one.

2 cc. of dihydropyrane were added to a solution of 0.8 g. of the latter steroid in 15 cc. of benzene and about 1 cc. was distilled to remove moisture. 0.4 g. of p-toluenesulfonic acid were added to the cooled solution, which was then allowed to stand at room temperature for 24 hours. The solution was washed with sodium carbonate and water, dried and evaporated. The residue was chromatographed on 15 g. of neutral alumina. Crystallization of the fractions eluted with hexane from pentane yielded 3β,17β-bis-tetrahydropyranyloxy - 19-nor-Δ⁵⁽¹⁰⁾-androsten-6-one.

A solution of 0.5 g. of the latter steroid in 50 cc. of tetrahydrofuran was added over a 30 minutes period to a stirred suspension of 1 g. of lithium aluminum hydride in 50 cc. of anhydrous tetrahydrofuran. The mixture was refluxed for 2 hours, then cooled and cautiously treated with 5 cc. of ethyl acetate and 2 cc. of water. Solid sodium sulfate was added, the inorganic material filtered off and thoroughly washed with hot ethyl acetate, the combined organic solutions upon evaporation yielded a crude material, which was chromatographed on alumina to give 3β,17β-bis-tetrahydropyranyloxy - 19-nor-Δ⁵⁽¹⁰⁾-androsten-6α-ol.

The starting compounds listed under I were treated following the above procedures thus affording respectively the products set forth under II:

| I | II |
| --- | --- |
| 17α-methyl-19-nor-Δ⁵⁽¹⁰⁾-androstene-3β,6β,17β-triol. | 3β,17β-bis-tetrahydropyranyloxy-17α-methyl-19-nor-Δ⁵⁽¹⁰⁾-androsten-6α-ol. |
| 17α-vinyl-19-nor-Δ⁵⁽¹⁰⁾-androstene-3β,6β,17β-triol. | 3β,17β-bis-tetrahydropyranyloxy-17α-vinyl-19-nor-Δ⁵⁽¹⁰⁾-androsten-6α-ol. |
| 17α-ethinyl-19-nor-Δ⁵⁽¹⁰⁾-androstene-3β,6β,17β-triol. | 3β,17β-bis-tetrahydropyranyloxy-17α-ethinyl-19-nor-Δ⁵⁽¹⁰⁾-androsten-6α-ol. |

PREPARATION 5

The 3-acetate of $\Delta^5$-pregnene-3$\beta$,19-diol-20-one and the 3-acetate of 16$\alpha$-methyl-$\Delta^5$-pregnene - 3$\beta$,19-diol-20-one were treated following the procedure of Preparation 1 to give respectively: the diacetate of 19-nor-$\Delta^{5(10)}$-pregnene-3$\beta$,6$\beta$-diol-20-one and the diacetate of 16$\alpha$-methyl-19-nor-$\Delta^{5(10)}$-pregnene-3$\beta$,6$\beta$-diol-20-one.

PREPARATION 6

A mixture of 2 g. of the diacetate of 19-nor-$\Delta^{5(10)}$-pregnene-3$\beta$,6$\beta$-diol-20-one, 25 cc. of dry benzene, 10 cc. of ethylene glycol and 50 mg. of p-toluenesulfonic acid monohydrate was refluxed for 16 hours using a water separator. It was then washed with a sodium bicarbonate solution, water and subsequently dried and evaporated to dryness. Recrystallization from acetone-hexane yielded the diacetate of 20-cycloethylenedioxy-19-nor-$\Delta^{5(10)}$-pregnene-3$\beta$,6$\beta$-diol.

A solution of 0.17 g. of potassium hydroxide in 0.2 cc. of water and 2.5 cc. of methanol was added over 30 minutes to a boiling solution of 1.5 g. of the latter compound in 30 cc. of methanol. Boiling was continued for a further 2 hours and the solution was then cooled, neutralized with acetic acid and concentrated under reduced pressure. Addition of water, followed by crystallization of the precipitated solid from acetone-hexane, produced 20-cycloethylenedioxy - 19-nor-$\Delta^{5(10)}$ - pregnene-3$\beta$,6$\beta$-diol.

The latter compound was treated according to Preparation 4, thus giving as final compound 3$\beta$-tetrahydropyranyloxy - 20-cycloethylenedioxy - 19-nor-$\Delta^{5(10)}$-pregnen-6$\alpha$-ol.

Upon treatment of the diacetate of 16$\alpha$-methyl-19-nor-$\Delta^{5(10)}$-pregnene-3$\beta$,6$\beta$-diol-20-one by the same sequence of reactions, there was produced as final compound 3$\beta$-tetrahydropyranyloxy-20-cycloethylenedioxy-16$\alpha$-methyl - 19-nor-$\Delta^{5(10)}$-pregnene-3$\beta$,6$\beta$-diol-20-one.

Example I

A mixture of 5 g. of 3$\beta$,17$\beta$-bis-tetrahydro-pyranyloxy-19-nor-$\Delta^{5(10)}$-androsten-6$\alpha$-ol, 3 g. of freshly crystallized mercuric acetate and 100 cc. of purified ethyl-vinyl-ether was refluxed for 10 hours. The resulting mixture was cooled, washed with cold aqueous sodium carbonate solution, dried and concentrated to a small volume. The concentrate was chromatographed on alumina, thus giving 3$\beta$,17$\beta$-bis - tetrahydropyranyloxy - 6$\alpha$ - vinyloxy - 19-nor-$\Delta^{5(10)}$-androstene (compound No. 1).

The compounds listed hereinafter under I were treated by the same procedure, thus giving the corresponding products set forth under II.

| I | Cpd. No. | II |
|---|---|---|
| 3$\beta$,17$\beta$-bis-tetrahydro-pyranyloxy-17$\alpha$-methyl-19-nor-$\Delta^{5(10)}$-androsten-6$\alpha$-ol. | 2 | 3$\beta$,17$\beta$-bis-tetrahydro-pyranyloxy-6$\alpha$-vinyl-oxy-17$\alpha$-methyl-19-nor-$\Delta^{5(10)}$-androstene. |
| 3$\beta$,17$\beta$-bis-tetrahydro-pyranyloxy-17$\alpha$-vinyl-19-nor-$\Delta^{5(10)}$-androsten-6$\alpha$-ol. | 3 | 3$\beta$,17$\beta$-bis-tetrahydro-pyranyloxy-6$\alpha$-vinyloxy-17$\alpha$-vinyl-19-nor-$\Delta^{5(10)}$-androstene. |
| 3$\beta$,17$\beta$-bis-tetrahydro-pyranyloxy-17$\alpha$-ethinyl-19-nor-$\Delta^{5(10)}$-androsten-6$\alpha$-ol. | 4 | 3$\beta$,17$\beta$-bis-tetrahydro-pyranyloxy-6$\alpha$-vinyl-oxy-17$\alpha$-ethinyl-19-nor-$\Delta^{5(10)}$-androstene. |

Example II

A mixture of 1 g. of compound No. 1 and 10 cc. of decalin was refluxed, under nitrogen, for 4 hours, then it was evaporated to dryness under reduced pressure. The resulting residue was crystallized from acetone-hexane, thus giving 3$\beta$,17$\beta$-bis-tetrahydropyranyloxy-19-formyl-$\Delta^5$-10$\alpha$-androstene (Cpd. No. 5).

The compounds Nos. 2, 3 and 4 were treated following the same procedure, thus giving respectively:

Cpd. No.:
  6. 3$\beta$,17$\beta$-bis-tetrahydropyranyloxy-19-formyl-17$\alpha$-methyl-$\Delta^5$-10$\alpha$-androstene.
  7. 3$\beta$,17$\beta$-bis-tetrahydropyranyloxy-19-formyl-17$\alpha$-vinyl-$\Delta^5$-10$\alpha$-androstene.
  8. 3$\beta$,17$\beta$-bis-tetrahydropyranyloxy-19-formyl-17$\alpha$-ethinyl-$\Delta^5$-10$\alpha$-androstene.

Example III

A solution of 1 g. of sodium borohydride in 3 cc. of water was added to an ice-cooled solution of 1 g. of compound No. 5 in 120 cc. of methanol and the mixture was allowed to stand for 16 hours at room temperature. The excess reagent was decomposed by addition of acetic acid, the solution concentrated to small volume in vacuo and diluted with water. The product was extracted with ethyl acetate, the extract was washed with water, dried and evaporated. The solid residue was purified by crystallization from acetone-hexane to give 3$\beta$,17$\beta$-bis-tetrahydropyranyloxy-19-hydroxymethyl-$\Delta^5$-10$\alpha$-androstene (Cpd. No. 9).

Compounds Nos. 6, 7 and 8 were treated following the latter procedure to give respectively:

Cpd. No.:
  10. 3$\beta$,17$\beta$-bis-tetrahydropyranyloxy-19-hydroxymethyl-17$\alpha$-methyl-$\Delta^5$-10$\alpha$-androstene.
  11. 3$\beta$,17$\beta$-bis-tetrahydropyranyloxy-19-hydroxymethyl-17$\alpha$-vinyl-$\Delta^5$-10$\alpha$-androstene.
  12. 3$\beta$,17$\beta$-bis-tetrahydropyranyloxy-19-hydroxymethyl-17$\alpha$-ethinyl-$\Delta^5$-10$\alpha$-androstene.

Example IV

A solution of 1 g. of compound No. 9 in 5 cc. of pyridine was treated with 0.5 g. of tosyl chloride and kept at 0° C. for 24 hours, it was then diluted with water and the precipitate separated by filtration, thus giving 3$\beta$,17$\beta$-bis-tetrahydropyranyloxy -19- tosyloxymethyl - $\Delta^5$ - 10$\alpha$ - androstene (Cpd. No. 13).

The compounds Nos. 10, 11, and 12 were treated following the latter procedure, to give respectively:

Cpd. No.:
  14. 3$\beta$,17$\beta$-bis-tetrahydropyranyloxy-19-tosyloxymethyl-17$\alpha$-methyl-$\Delta^5$-10$\alpha$-androstene.
  15. 3$\beta$,17$\beta$-bis-tetrahydropyranyloxy-19-tosyloxymethyl-17$\alpha$-vinyl-$\Delta^5$-10$\alpha$-androstene.
  16. 3$\beta$,17$\beta$-bis-tetrahydropyranyloxy-19-tosyloxymethyl-17$\alpha$-ethinyl-$\Delta^5$-10$\alpha$-androstene.

Example V

A suspension of 10 g. of potassium fluoride in 50 cc. of dimethyl formamide was heated to boiling and then a solution of 2 g. of compound No. 13 in 10 cc. of dimethyl formamide was added. The mixture was refluxed for 5 hours, cooled and poured into water. The formed precipitate was filtered off and crystallized to give 3$\beta$,17$\beta$-bis-tetrahydropyranyloxy - 19 - fluoro - methyl - $\Delta^5$ - 10$\alpha$-androstene (Cpd. No. 17).

The compounds Nos. 14, 15 and 16, were treated in accordance with the latter procedure, thus affording respectively:

Cpd. No.:
  18. 3$\beta$,17$\beta$-bis-tetrahydropyranyloxy-19-fluoromethyl-17$\alpha$-methyl-$\Delta^5$-10$\alpha$-androstene.
  19. 3$\beta$,17$\beta$-bis-tetrahydropyranyloxy-19-fluoromethyl-17$\alpha$-vinyl-$\Delta^5$-10$\alpha$-androstene.
  20. 3$\beta$,17$\beta$-bis-tetrahydropyranyloxy-19-fluoromethy-17$\alpha$-ethinyl-$\Delta^5$-10$\alpha$-androstene.

Example VI

The starting compounds of Example V were treated following exactly the procedure set forth in that example, except that potassium fluoride was substituted by lithium chloride, thus giving respectively:

Cpd. No.:
21. 3β,17β-bis-tetrahydropyranyloxy-19-chloromethyl-Δ⁵-10α-androstene.
22. 3β,17β-bis-tetrahydropyranyloxy-19-chloromethyl-17α-methyl-Δ⁵-10α-androstene.
23. 3β,17β-bis-tetrahydropyranyloxy-19-chloromethyl-17α-vinyl-Δ⁵-10α-androstene.
24. 3β,17β-bis-tetrahydropyranyloxy-19-chloromethyl-17α-ethinyl-Δ⁵-10α-androstene.

*Example VII*

Thee starting compounds of Example V were treated in accordance with said example except that lithium bromide was used instead of potassium fluoride, thus furnishing respectively:

Cpd. No.:
25. 3β,17β-bis-tetrahydropyranyloxy-19-bromomethyl-Δ⁵-10α-androstene.
26. 3β,17β-bis-tetrahydropyranyloxy-19-bromomethyl-17α-methyl-Δ⁵-10α-androstene.
27. 3β,17β-bis-tetrahydropyranyloxy-19-bromomethyl-17α-vinyl-Δ⁵-10α-androstene.
28. 3β,17β-bis-tetrahydropyranyloxy-19-bromomethyl-17α-ethinyl-Δ⁵-10α-androstene.

*Example VIII*

The starting compounds of Example V were treated following the procedure described in said example, except that potassium fluoride was substituted by potassium cyanide and acetonitrile was used instead of dimethyl formamide thus giving respectively:

Cpd. No.:
29. 3β,17β-bis-tetrahydropyranyloxy-19-cyanomethyl-Δ⁵-10α-androstene.
30. 3β,17β-bis-tetrahydropyranyloxy-19-cyanomethyl-17α-methyl-Δ⁵-10α-androstene.
31. 3β,17β-bis-tetrahydropyranyloxy-19-cyanomethyl-17α-vinyl-Δ⁵-10α-androstene.
32. 3β,17β-bis-tetrahydropyranyloxy-19-cyanomethyl-17α-ethinyl-Δ⁵-10α-androstene.

*Example IX*

A suspension of 14.5 g. of triphenylphosphonium methyl bromide in 250 cc. of anhydrous ether was treated, under an atmosphere of nitrogen, with 40 cc. of a 1 N ethereal solution of butyl lithium and the mixture was stirred for 2 hours at room temperature. A solution of 5 g. of compound No. 5 in 100 cc. of ether was then added dropwise in the course of 15 minutes and with stirring. The reaction mixture was stirred for 6 hours further and let stand at room temperature overnight. The ether was displaced with dry tetrahydrofuran by distillation and then refluxed for 8 hours. It was then cooled, diluted with water and extracted several times with ethyl acetate, the organic extract was washed with water, dried over anhydrous sodium sulfate and evaporated to dryness. Chromatography of the residue and recrystallization of the solid eluates from acetone-hexane gave 3β-17β-bis-tetrahydropyranyloxy - 19 - vinyl-Δ⁵-10α-androstene (Cpd. No. 33).

The compounds Nos. 6, 7 and 8 were treated by the same procedure, thus giving respectively:

Cpd. No.:
34. 3β,17β-bis-tetrahydropyranyloxy-19-vinyl-17α-methyl-Δ⁵-10α-androstene.
35. 3β,17β-bis-tetrahydropyranyloxy-17α,19-divinyl-Δ⁵-10α-androstene.
36. 3β,17β-bis-tetrahydropyranyloxy-19-vinyl-17α-ethinyl-Δ⁵-10α-androstene.

*Example X*

To a solution of 1 g. of compound No. 5 in 30 cc. of acetic acid was added 0.5 cc. of 2 N hydrochloric acid. After 5 hours at room temperature, ice water was added and the product extracted with methylene chloride. The extract was washed to neutral, dried over anhydrous sodium sulfate and evaporated to dryness. Crystallization from acetone-hexane yielded 19-formyl-Δ⁵-10α-androstene-3β,17β-diol (Cpd. No. 37). The compounds Nos. 6 to 36, inclusive, were treated by the same procedure, thus giving respectively:

Cpd. No.:
38. 19-formyl-17α-methyl-Δ⁵-10α-androstene-3β,17β-diol.
39. 19-formyl-17α-vinyl-Δ⁵-10α-androstene-3β,17β-diol.
40. 19-formyl-17α-ethinyl-Δ⁵-10α-androstene-3β,17β-diol.
41. 19-hydroxymethyl-Δ⁵-10α-androstene-3β,17β-diol.
42. 19-hydroxymethyl-17α-methyl-Δ⁵-10α-androstene-3β,17β-diol.
43. 19-hydroxymethyl-17α-vinyl-Δ⁵-10α-androstene-3β,17β-diol.
44. 19-hydroxymethyl-17α-ethinyl-Δ⁵-10α-androstene-3β,17β-diol.
45. 19-tosyloxymethyl-Δ⁵-10α-androstene-3β,17β-diol.
46. 19-tosyloxymethyl-17α-methyl-Δ⁵-10α-androstene-3β,17β-diol.
47. 19-tosyloxymethyl-17α-vinyl-Δ⁵-10α-androstene-3β,17β-diol.
48. 19-tosyloxymethyl-17α-ethinyl-Δ⁵-10α-androtene3-β,17β-diol.
49. 19-fluoromethyl-Δ⁵-10α-androstene-3β,17β-diol.
50. 19-fluoromethyl-17α-methyl-Δ⁵-10α-androstene-3β,17β-diol.
51. 19-fluoro-methyl-17α-vinyl-Δ⁵-10α-androstene-3β,17β-diol.
52. 19-fluoro-methyl-17α-ethinyl-Δ⁵-10α-androstene-3β,17β-diol.
53. 19-chloro-methyl-Δ⁵-10α-androstene-3β,17β-diol.
54. 19-chloro-methyl-17α-methyl-Δ⁵-10α-androstene-3β,17β-diol.
55. 19-chloro-methyl-17α-vinyl-Δ⁵-10α-androstene-3β,17β-diol.
56. 19-chloro-methyl-17α-ethinyl-Δ⁵-10α-androstene-3β,17β-diol.
57. 19-bromomethyl-Δ⁵-10α-androstene-3β,17β-diol.
58. 19-bromomethyl-17α-methyl-Δ⁵-10α-androstene-3β,17β-diol.
59. 19-bromomethyl-17α-vinyl-Δ⁵-10α-androstene-3β,17β-diol.
60. 19-bromomethyl-17α-ethinyl-Δ⁵-10α-androstene-3β,17β-diol.
61. 19-cyanomethyl-Δ⁵-10α-androstene-3β,17β-diol.
62. 19-cyanomethyl-17α-methyl-Δ⁵-10α-androstene-3β,17β-diol.
63. 19-cyanomethyl-17α-vinyl-Δ⁵-10α-androstene-3β,17β-diol.
64. 19-cyanomethyl-17α-ethinyl-Δ⁵-10α-androstene-3β,17β-diol.
65. 19-vinyl-Δ⁵-10α-androstene-3β,17β-diol.
66. 19-vinyl-17α-methyl-Δ⁵-10α-androstene-3β,17β-diol.
67. 17α,19-divinyl-Δ⁵-10α-androstene-3β,17β-diol.
68. 19-vinyl-17α-ethinyl-Δ⁵-10α-androstene-3β,17β-diol.

*Example XI*

A solution of 1 g. of compound No. 37 in 80 cc. of toluene and 20 cc. of cyclohexanone was dried by distilling off 10 cc. of the solvent. A solution of 1 g. of aluminum isopropoxide dissolved in 7 cc. of anhydrous toluene was then added and the mixture was refluxed for 15 minutes; 4 cc. of acetic acid were added and the solvents removed by steam distillation. The product was extracted several times with ethyl acetate and the organic extracts washed with 5% hydrochloric acid solution, water, 10% sodium carbonate solution and water until neutral, dried over anhydrous sodium sulfate and evaporated to dryness. Crystallization from acetone-hexane afforded 19-formyl-$\Delta^4$-10α-androsten-17β-ol-3-one (Cpd. No. 69).

The compounds Nos. 38 to 68, inclusive, were treated by the latter procedure; thus affording respectively Cpd. No.:
- 70. 19-formyl-17α-methyl-$\Delta^4$-10α-androsten-17β-ol-3-one.
- 71. 19-formyl-17α-vinyl-$\Delta^4$-10α-androsten-17β-ol-3-one.
- 72. 19-formyl-17α-ethinyl-$\Delta^4$-10α-androsten-17β-ol-3-one.
- 73. 19-hydroxymethyl-$\Delta^4$-10α-androsten-17β-ol-3-one.
- 74. 19-hydroxymethyl-17α-methyl-$\Delta^4$-10α-androsten-17β-ol-3-one.
- 75. 19-hydroxymethyl-17α-vinyl-$\Delta^4$-10α-androsten-17β-ol-3-one.
- 76. 19-hydoxymethyl-17α-ethinyl-$\Delta^4$-10α-androsten-17β-ol-3-one.
- 77. 19-tosyloxymethyl-$\Delta^4$-10α-androsten-17β-ol-3-one.
- 77. 19-tosyloxymethyl-$\Delta^4$-10α-androsten-17β-ol-3-one.
- 78. 19-tosyloxymethyl-17α-methyl-$\Delta^4$-0α-andosten-17β-ol-3-one.
- 79. 19-tosyloxymethyl-17α-vinyl-$\Delta^4$-10α-androsten-17β-ol-3-one.
- 80. 19-tosyloxymethyl-17α-ethinyl-$\Delta^4$-10α-androsten-17β-ol-3-one.
- 81. 19-fluoro-methyl-$\Delta^4$-10α-androsten-17β-ol-3-one.
- 82. 19-fluoromethyl-17α-methyl-$\Delta^4$-10α-androsten-17β-ol-3-one.
- 83. 19-fluoromethyl-17α-vinyl-$\Delta^4$-10α-androsten-17β-ol-3-one.
- 84. 19-fluoromethyl-17α-ethinyl-$\Delta^4$-10α-androsten-17β-ol-3-one.
- 85. 19-chloromethyl-$\Delta^4$-10α-androsten-17β-ol-3-one.
- 86. 19-chloromethyl-17α-methyl-$\Delta^4$-10α-androsten-17β-ol-3-one.
- 87. 19-chloromethyl-17α-vinyl-$\Delta^4$-10α-androsten-17β-ol-3-one.
- 88. 19-chloromethyl-17α-ethinyl-$\Delta^4$-10α-androsten-17β-ol-3-one.
- 89. 19-bromomethyl-$\Delta^4$-10α-androsten-17β-ol-3-one.
- 90. 19-bromomethyl-17α-methyl-$\Delta^4$-10α-androsten-17β-ol-3-one.
- 91. 19-bromomethyl-17α-vinyl-$\Delta^4$-10α-androsten-17β-ol-3-one.
- 92. 19-bromomethyl-17α-ethinyl-$\Delta^4$-10α-androsten-17β-ol-3-one.
- 93. 19-cyanomethyl-$\Delta^4$-10α-androsten-17β-ol-3-one.
- 94. 19-cyanomethyl-17α-methyl-$\Delta^4$-10α-androsten-17β-ol-3-one.
- 95. 19-cyanomethyl-17α-vinyl-$\Delta^4$-10α-androsten-17β-ol-3-one.
- 96. 19-cyanomethyl-17α-ethinyl-$\Delta^4$-10α-androsten-17β-ol-3-one.
- 97. 19-vinyl-$\Delta^4$-10α-androsten-17β-ol-3-one.
- 98. 19-vinyl-17α-methyl-$\Delta^4$-10α-androsten-17β-ol-3-one.
- 99. 17α,19-divinyl-$\Delta^4$-10α-androsten-17β-ol-3-one.
- 100. 19-vinyl-17α-ethinyl-$\Delta^4$-10α-androsten-17β-ol-3-one.

*Example XII*

A mixture of 1 g. of compound No. 37, 4 cc. of pyridine and 2 cc. of acetic anhydride was kept at room temperature overnight, poured into ice water, the formed precipitate was filtered, washed with water and dried. Crystallization from acetone-hexane gave the diacetate of 19-formyl-$\Delta^5$-10α-androstene-3β,17β-diol (Cpd. No. 101).

The compounds Nos. 41, 45, 49, 53, 57, 61, 65, 69, 73, 77, 81, 85, 93 and 97 were treated by the above procedure, thus affording respectively:

Cpd. No.:
- 102. 19-acetoxymethyl-$\Delta^5$-10α-androstene-3β,17β-diol diacetate,
- 103. 19-tosyloxymethyl-$\Delta^5$-10α-androstene-3β,17β-diol diacetate.
- 104. 19-fluoromethyl-$\Delta^5$-10α-androstene-3β,17β-diol diacetate.
- 105. 19-chloromethyl-$\Delta^5$-10α-androstene-3β,17β-diol diacetate.
- 106. 19-bromomethyl-$\Delta^5$-10α-androstene-3β,17β-diol diacetate.
- 107. 19-cyanomethyl-$\Delta^5$-10α-androstene-3β,17β-diol diacetate.
- 108. 19-vinyl-$\Delta^5$-10α-androstene-3β,17β-diol diacetate.
- 109. 19-formyl-$\Delta^4$-10α-androsten-17β-ol-3-one acetate.
- 110. 19-acetoxymethyl-$\Delta^4$-10α-androsten-17β-ol-3-one acetate.
- 111. 19-tosyloxymethyl-$\Delta^4$-10α-androsten-17β-ol-3-one acetate.
- 112. 19-fluoromethyl-$\Delta^4$-10α-androsten-17β-ol-3-one acetate.
- 113. 19-chloromethyl-$\Delta^4$-10α-androsten-17β-ol-3-one acetate.
- 114. 19-cyano-methyl-$\Delta^4$-10α-androsten-17β-ol-3-one acetate.
- 115. 19-vinyl-$\Delta^4$-10α-androsten-17β-ol-3-one acetate.

*Example XIII*

The starting compounds of Example XII were treated following exactly the procedure described in that example, except that acetic anhydride was substituted by caproic anhydride, propionic anhydride, enanthic anhydride and cyclopentylpropionic anhydride thus affording respectively the corresponding caproates, propionates, enanthates and cyclophentylpropionates of said starting compounds.

*Example XIV*

The compounds Nos. 38, 43 and 52 were treated by the procedure described in Example XII, thus giving respectively: 19-formyl-17α-methyl-$\Delta^5$-10α-androstene-3β,17β-diol 3-acetate (Cpd. No. 116), 19-acetoxymethyl-17α-vinyl-$\Delta^5$-10α-androstene-3β,17β-diol 3-acetate (Cpd. No. 117), 19 - fluoromethyl-17α-ethinyl-$\Delta^5$-10α-androstene-3β,17β-diol 3-acetate (Cpd. No. 118).

*Example XV*

To a solution of 5 g. of compound No. 38 in 100 cc. of anhydrous benzene there were added 1 g. of p-toluenesulfonic acid and 10 cc. of caproic anhydride and the mixture was allowed to stand for 24 hours at room temperature, poured into ice and water, and the resulting mixture stirrred to effect hydrolysis of the excess anhydride. The benzene layer was separated and washed with 10% sodium carbonate solution and water. Drying, evaporation and crystallization of the residue from ether-hexane produced 19-formyl-17α-methyl-Δ⁵-10α-androstene-3β,17β-diol dicaproate (Cpd. No. 119).

The compounds Nos. 39, 40, 46, 47, 48, 50, 51, 52, 54, 55, 56, 58, 59, 60, 62, 63, 64, 66, 67 and 68 were converted into the corresponding dicaproates by the above procedure. Upon treatment of compounds Nos. 42, 43, and 44 by the same method, there were obtained the corresponding tricaproates.

*Example XVI*

The compounds Nos. 70, 74, 79, 84, 86, 91, 96 and 98 were treated in accordance with the foregoing example, thus affording respectively:

Cpd. No.:
120. 19 - formyl - 17α-methyl-Δ⁴-10α-androsten-17β-ol-3-one caproate.
121. 19 - caproxymethyl - 17α-methyl-Δ⁴-10α-androsten-17β-ol-3-one caproate.
122. 19 - tosyloxymethyl - 17α - vinyl - Δ⁴ - androsten-17β-ol-3-one-caproate.
123. 19 - fluoromethyl - 17α - ethinyl-Δ⁴-10α-androsten-17β-ol-3-one-caproate.
124. 19 - chloromethyl - 17α - methyl-Δ⁴-10α-androsten-17β-ol-3-one caproate.
125. 19 - bromomethyl - 17α-vinyl-Δ⁴-10α-androsten-17β-ol-3-one caproate.
126. 19 - cyanomethyl - 17α - ethinyl-Δ⁴-10α-androsten-17β-ol-3-one caproate.
127. 19 - vinyl - 17α - methyl-Δ⁴-10α-androsten-17β-ol-3-one caproate.

*Example XVII*

The starting compounds of Examples XV and XVI were treated following exactly the procedure described in Example XV, except that caproic anhydride was substituted by acetic anhydride, propionic anhydride, enanthic anhydride and cyclopentylpropionic anhydride thus affording respectively the corresponding acetates, propionates enanthates, and cyclopentylpropionates of said starting compounds.

*Example XVIII*

The procedure of Example I was repeated except that mercuric acetate and ethyl vinyl ether were substituted respectively by mercuric oxalate and n-butylvinylether and that the reflux time was of 1 hour, thus giving exactly the same compounds.

*Example XIX*

The procedure of Example II was repeated, except that decalin was substituted by diglyme and the reflux time was of 6 hours, thus yielding the same compounds.

*Example XX*

The procedure of Example II was repeated, except that the steroids were heated at 195° C. in a sealed tube, for 2 hours without solvent, thus furnishing the same results.

*Example XXI*

2 cc. of dihydropyrane were added to a solution of 1 g. of compound No. 69 in 15 cc. of benzene and about 1 cc. was distilled to remove moisture. 0.4 g. of p-toluenesulfonic acid were added to the cooled solution, which was then allowed to stand at room temperature for 4 days. The solution was washed with sodium carbonate and water, dried and evaporated. The residue was chromatographed on 15 g. of neutral alumina. Crystallization of the solid fractions afforded the tetrahydropyranyl-ether of 19-formyl-Δ⁴-10α-androsten-17β-ol-3-one (Cpd. No. 128).

The compounds Nos. 70 to 100, inclusive, were treated by the same procedure, thus yielding the corresponding tetrahydropyranylethers.

*Example XXII*

The compounds Nos. 9, 10, 11, and 12 were treated by the procedure of Example XII thus affording the corresponding 19-acetates.

*Example XXIII*

3β - tetrahydropyranyloxy - 20 - cycloethylenedioxy-19-nor-Δ⁵⁽¹⁰⁾-pregnen-6α-ol and 3β-tetrahydropyranyloxy-20-cycloethylenedioxy - 16α - methyl - 19-nor-Δ⁵⁽¹⁰⁾-pregnen-6α-ol were treated according to Example I, thus giving respectively: 3β-tetrahydropyranyloxy-6α-vinyloxy-20-cycloethylenedioxy-19-nor-Δ⁵⁽¹⁰⁾-pregnene (Cpd. No. 129) and 3β-tetrahydropyranyloxy-6α-vinyloxy-20-cycloethylenedioxy-16α-methyl-19-nor-Δ⁵⁽¹⁰⁾-pregnene (Cpd. No. 130).

The two latter compounds were, in turn, treated following the procedure described in Example II, to give respectively: 3β-tetrahydropyranyloxy-19-formyl-20-cycloethylenedioxy-Δ⁵-10α-pregnene (Cpd. No. 131), and 3β-tetrahydropyranyloxy - 19 - formyl - 20 - cycloethylenedioxy-16α-methyl-Δ⁵-10α-pregnene (Cpd. No. 132).

*Example XXIV*

The procedure of Example I was repeated, except that ethyl-vinylether was substituted by 2-ethoxy-ethylvinylether, and reflux time was of 5 hours thus being produced the same results.

*Example XXV*

The procedure of Example I was repeated, except that ethylvinyl ether was substituted by 1,2-divinyloxyethane, thus yielding the results.

*Example XXVI*

Upon repeating the procedure of Example I, except that the amount of mercuric acetate used was 0.1 g. and reflux time was 15 hours there were obtained the same compounds as in said example.

*Example XXVII*

When using 10 g. of mercuric acetate and following exactly the rest of the procedure described in Example I, there were obtained the same results as in said example.

I claim:
1. A compound of the following formula:

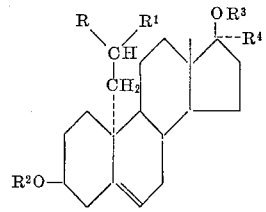

wherein R is selected from the group consisting of hydroxyl, tosyloxy, a hydrocarbon carboxylic acyloxy group of less than 12 carbon atoms, and a cyano group; R¹ is hydrogen; R and R¹, together, are selected from the group consisting of an oxygen atom and a methylene grouping; R² and R³ are selected from the group consisting of hydrogen, a hydrocarbon carboxylic acyl group of less than 12 carbon atoms and a tetrahydropyranyl grouping; and R⁴ is a member of the group consisting of hydrogen, lower alkyl, lower alkenyl and lower alkinyl.

2. A compound of the following formula:

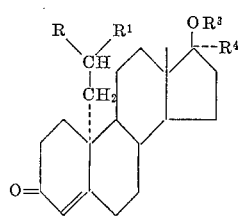

wherein R is selected from the group consisting of hydroxyl, tosyloxy, a hydrocarbon carboxylic acyloxy group of less than 12 carbon atoms, and a cyano group; $R^1$ is hydrogen; $R^3$ is selected from the group consisting of hydrogen, a hydrocarbon carboxylic acyl group of less than 12 carbon atoms and a tetrahydropyranyl grouping; and $R^4$ is a member of the group consisting of hydrogen, lower alkyl, lower alkenyl and lower alkinyl.

3. A compound of the following formula:

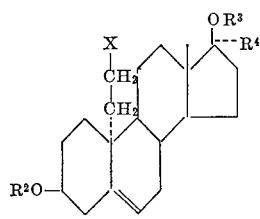

wherein X is a halogen atom having an atomic weight of less than 125; $R^2$ and $R^3$ are selected from the group consisting of hydrogen, a hydrocarbon carboxylic acyl group of less than 12 carbon atoms and a tetrahydropyranyl grouping; and $R^4$ is a member of the group consisting of hydrogen, lower alkyl, lower alkenyl and lower alkinyl.

4. A process for the production of a 19-formyl-$\Delta^5$-10α steroid, selected from the group consisting of the androstane and pregnane series which comprises treating the corresponding 6α-hydroxy-$\Delta^{5(10)}$-19-nor steroid with at least one molar equivalent of a liquid hydrocarbon aliphatic compound of up to 12 carbon atoms having at least one vinyloxy grouping in the molecule, in the presence of a catalytic amount of a mercuric salt of a weak acid, and heating the produced 6α-vinyloxy-$\Delta^{5(10)}$-19-nor steroid to a temperature between approximately 130° C. and 200° C.

5. The process of claim 4 wherein the liquid hydrocarbon aliphatic compound is selected from the group consisting of lower alkyl vinyl ethers, (lower alkoxy lower alkyl) vinyl ethers and divinyloxy lower alkanes, the reaction is carried out at reflux temperature for a period of time of about 1 to 15 hours and the final heating is maintained for about 2 to 6 hours.

6. The process of claim 4 wherein the liquid aliphatic compound is ethyl vinyl ether.

7. The process of claim 4 wherein the liquid aliphatic compound is n-butyl vinyl ether.

8. The process of claim 4 wherein the liquid aliphatic compound is 2-ethoxy ethyl vinyl ether.

9. The process of claim 4 wherein the liquid aliphatic compound is 1,2-divinyloxy ethane.

10. The process of claim 4 wherein the mercuric salt is mercuric acetate.

11. The process of claim 4 wherein the mercuric salt is mercuric oxalate.

12. 3β,17β - bis - tetrahydropyranyloxy - 19-formyl-$\Delta^5$-10α-androstene.

13. 3β,17β - bis - tetrahydropyranyloxy - 19 - formyl-17α-methyl-$\Delta^5$-10α-androstene.

14. 3β,17β - bis - tetrahydropyranyloxy - 19 - formyl - 17α-vinyl-$\Delta^5$-10α-androstene.

15. 3β,17β - bis - tetrahydropyranyloxy - 19 - formyl - 17α-ethinyl-$\Delta^5$-10α-androstene.

16. 3β,17β - bis - tetrahydropyranyloxy - 19 - hydroxymethyl-$\Delta^5$-10α-androstene.

17. 3β,17β - bis - tetrahydropyranyloxy - 19 - hydroxymethyl-17α-methyl-$\Delta^5$-10α-androstene.

18. 3β,17β - bis - tetrahydropyranyloxy - 19 - hydroxymethyl-17α-vinyl-$\Delta^5$-10α-androstene.

19. 3β,17β - bis- tetrahydropyranyloxy - 19 - hydroxymethyl-17α-ethinyl-$\Delta^5$-10α-androstene.

20. 19-formyl-$\Delta^5$-10α-androstene-3β,17β-diol.

21. 19 - formyl - 17α - methyl - $\Delta^5$ - 10α - androstene-3β,17β-diol.

22. 19 - formyl - 17α - vinyl - $\Delta^5$ - 10α - androstene - 3β,17β-diol.

23. 19 - formyl - 17α - ethinyl - $\Delta^5$ - 10a - androstene - 3β,17β-diol.

References Cited by the Examiner

UNITED STATES PATENTS 3,210,389    10/1965    Bowers _____ 260—397.4

LEWIS GOTTS, *Primary Examiner.*

HENRY FRENCH, *Assistant Examiner.*

UNITED STATES PATENT OFFICE
CERTIFICATE OF CORRECTION

Patent No. 3,284,448 November 8, 1966

Alexander D. Cross

It is hereby certified that error appears in the above numbered patent requiring correction and that the said Letters Patent should read as corrected below.

Column 9, line 15, for "Thee" read -- The --; column 10, line 34, strike out "stene"; line 36, for "tene3-β" read -- stene-3β --; column 11, lines 32 and 33, strike out "77. 19-tosyloxymethyl-$\Delta^4$-10α-androsten-17β-ol-3-one"; line 34, for "0α-andosten" read -- 10α-androsten --; column 12, line 52, for "cyclophentylpropionates" read -- cyclopentylpropionates --; column 13, line 20, for "$\Delta^4$-andro-" read -- $\Delta^4$-10α-androsten-17β-ol-3-one caproate. --.

Signed and sealed this 29th day of August 1967.

(SEAL)
Attest:

ERNEST W. SWIDER
Attesting Officer

EDWARD J. BRENNER
Commissioner of Patents